United States Patent
Li

(10) Patent No.: US 9,108,255 B2
(45) Date of Patent: Aug. 18, 2015

(54) FAST KNOCKDOWN CUTTING TOOL ASSEMBLY

(71) Applicant: GISON MACHINERY CO., LTD., Taichung (TW)

(72) Inventor: Kuang-Tai Li, Taichung (TW)

(73) Assignee: GISON MACHINERY CO., LTD., Taichung (TW)

( * ) Notice: Subject to any disclaimer, the term of this patent is extended or adjusted under 35 U.S.C. 154(b) by 383 days.

(21) Appl. No.: 13/751,793

(22) Filed: Jan. 28, 2013

(65) Prior Publication Data

US 2014/0212237 A1 Jul. 31, 2014

(51) Int. Cl.
| | |
|---|---|
| *B23B 31/107* | (2006.01) |
| *B23C 5/26* | (2006.01) |
| *B23B 31/00* | (2006.01) |
| *B23B 51/04* | (2006.01) |
| *B24D 5/06* | (2006.01) |
| *B23B 31/22* | (2006.01) |

(52) U.S. Cl.
CPC ............... *B23C 5/26* (2013.01); *B23B 31/005* (2013.01); *B23B 31/1071* (2013.01); *B23B 51/0473* (2013.01); *B24D 5/06* (2013.01); *B23B 31/107* (2013.01); *B23B 31/22* (2013.01); *B23B 2231/028* (2013.01); *B23B 2231/0268* (2013.01); *Y10T 279/17743* (2015.01); *Y10T 279/17752* (2015.01); *Y10T 279/17811* (2015.01); *Y10T 408/907* (2015.01); *Y10T 408/95* (2015.01); *Y10T 408/953* (2015.01); *Y10T 409/30952* (2015.01)

(58) Field of Classification Search
CPC .. B23B 31/107; B23B 31/1071; B23B 31/22; B23B 2231/026; B23B 2231/0268
USPC ............ 408/226, 240, 239 R; 279/74, 75, 82, 279/125, 902, 905
See application file for complete search history.

(56) References Cited

U.S. PATENT DOCUMENTS

| | | | | |
|---|---|---|---|---|
| 1,168,540 | A | * | 1/1916 | Musselman ...................... 279/75 |
| 2,736,561 | A | * | 2/1956 | Hansen ............................ 279/75 |
| 4,900,202 | A | * | 2/1990 | Wienhold ....................... 408/240 |
| 5,704,744 | A | * | 1/1998 | Kleine et al. .................. 408/226 |
| 5,951,026 | A | * | 9/1999 | Harman et al. ................ 279/143 |
| 2007/0040339 | A1 | * | 2/2007 | Frauhammer et al. .......... 279/19 |

FOREIGN PATENT DOCUMENTS

DE 3421811 A1 * 12/1985

OTHER PUBLICATIONS

English translations of German patent No. DE 3421811A1 issued to Brix, Dec. 12, 1985.*

* cited by examiner

*Primary Examiner* — Daniel Howell
*Assistant Examiner* — Chwen-Wei Su
(74) *Attorney, Agent, or Firm* — Guice Patents PLLC

(57) ABSTRACT

A cutting tool assembly includes a mandrel member and a cutting tool. The mandrel member has a shaft rod and a slide sleeve fitted around the shaft rod. At least one alignment pin is mounted in the shaft rod and at least one engagement pin is disposed in the slide sleeve. At least one locking member is disposed between the shaft rod and the slide sleeve. The cutting tool has a shank body and a tool bit. At least one alignment sink is disposed on the shank body. When assembled, the shank body is plugged into the shaft rod to align the alignment pin with the alignment sink so as to release the slide sleeve from the engagement of the engagement pin, permitting the slide sleeve to move to a locking position where the locking member is latched with the cutting tool.

16 Claims, 10 Drawing Sheets

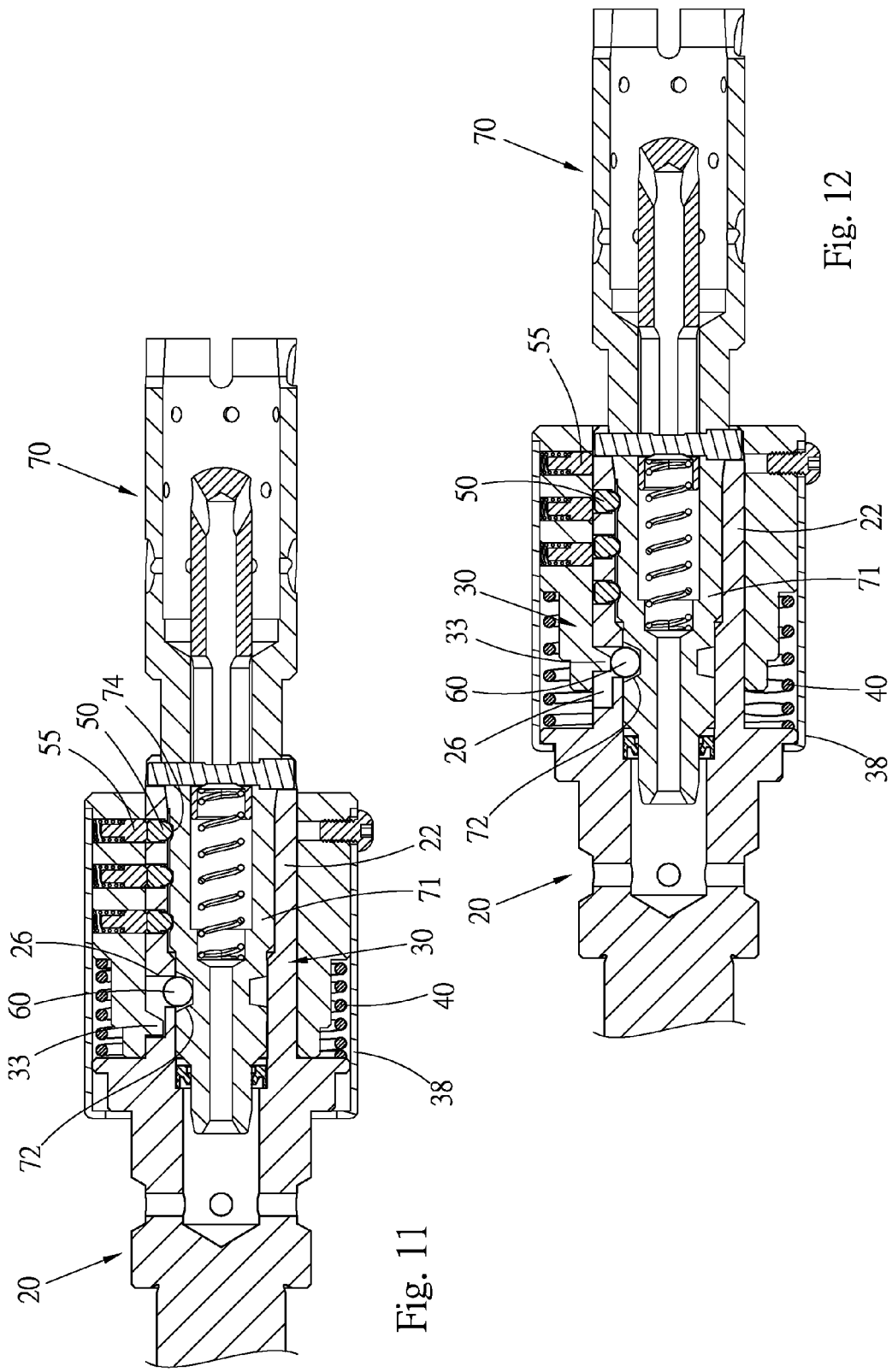

FAST KNOCKDOWN CUTTING TOOL ASSEMBLY

BACKGROUND OF THE INVENTION

1. Field of the Invention

The present invention relates generally to a cutting tool of a mechanical apparatus, and more particularly to a fast knockdown cutting tool assembly.

2. Description of the Related Art

A conventional tool machine with cutting or grinding function has a rotary shaft and a cutting tool installed on the rotary shaft. A power source of the tool machine serves to drive the rotary shaft to rotate, whereby the cutting tool can cut or grind a work piece.

A free end of the rotary shaft is provided with a holding device for holding the cutting tool. The cutting tool can be taken off from the holding device and replaced with another cutting tool.

In the conventional structure, it is often necessary to repeatedly align the cutting tool with the holding device for the holding device to truly hold the cutting tool. Therefore, it is time-consuming and inconvenient to install or uninstall the cutting tool.

Moreover, there is no management system between the conventional holding device and cutting tool. Therefore, it is hard to avoid unauthorized or improper assembly of the cutting tool with the tool machine.

SUMMARY OF THE INVENTION

It is therefore a primary object of the present invention to provide a cutting tool assembly in which the cutting tool can be quickly installed or uninstalled.

It is a further object of the present invention to provide the above fast knockdown cutting tool assembly, which includes a mandrel member and a cutting tool. Only a mandrel member and a cutting tool with identical specific combination code can be truly assembled and connected.

The cutting tool assembly of the present invention includes a mandrel member and a cutting tool; the mandrel member includes:

a shaft rod having a sleeve section at a front end of the shaft rod; a shaft cavity axially inward extending from a front end of the sleeve section; at least one locking hole and at least one engagement hole being formed through the sleeve section between inner circumference and outer circumference of the sleeve section;

a slide sleeve, which is a hollow collar body; at least one pinhole being disposed on the slide sleeve, the slide sleeve being fitted on the sleeve section of the shaft rod and slideable along the sleeve section without rotation, the slide sleeve being rearward slideable to a releasing position and forward slideable to a locking position, when the slide sleeve is positioned in the releasing position, the pinhole being aligned with the engagement hole;

an elastic member disposed between the shaft rod and the slide sleeve for providing an elastic force to keep pushing the slide sleeve forward;

at least one alignment pin disposed in the engagement hole and slideable within the engagement hole;

at least one engagement pin and at least one resilient member, which are disposed in the at least one pinhole, the engagement pin being slideable within the pinhole; the resilient member providing elastic force to keep the engagement pin moving to inner end of the pinhole, the engagement pin serving to push the alignment pin to slide to the inner end of the engagement hole; and at least one locking member disposed in the locking hole and slideable within the locking hole;

the cutting tool having a shank body and a tool bit disposed at one end of the shank body; a latch section is disposed on the shank body; at least one alignment sink is disposed on a circumference of the shank body.

When the shank body of the cutting tool is plugged into the shaft cavity of the sleeve section of the shaft rod, an inner end of the alignment pin contacts the alignment sink and the alignment pin is slid to the outer end of the engagement hole to push the engagement pin so as to make the inner end of the engagement pin moved out of the engagement hole. In this case, the slide sleeve is pushed by the elastic member to move to the locking position to make the locking member latched with the latch section of the cutting tool.

According to the above arrangement, the cutting tool can be quickly and conveniently plugged into the mandrel member and locked therewith. The position and depth of the alignment sink must conform to the position and length of the alignment pin for truly connecting the cutting tool with the mandrel member. With the specific conformation, the mandrel member and the cutting tool can be truly assembled and connected. Therefore, a user can manage the cutting tools to avoid incorrect installation or unauthorized installation of the cutting tools.

The present invention can be best understood through the following description and accompanying drawings, wherein:

BRIEF DESCRIPTION OF THE DRAWINGS

FIG. 2 is a perspective view of the mandrel member of the first embodiment of the present invention, showing that the mandrel member is in a ready state for a cutting tool to plug in;

FIG. 11 is a sectional view of a second embodiment of the present invention, showing that the cutting tool is plugged in the mandrel member; and FIG. 12 is a sectional view of the second embodiment of the present invention, showing that the slide sleeve is positioned in the locking position.

DETAILED DESCRIPTION OF THE PREFERRED EMBODIMENTS

Figure 1:
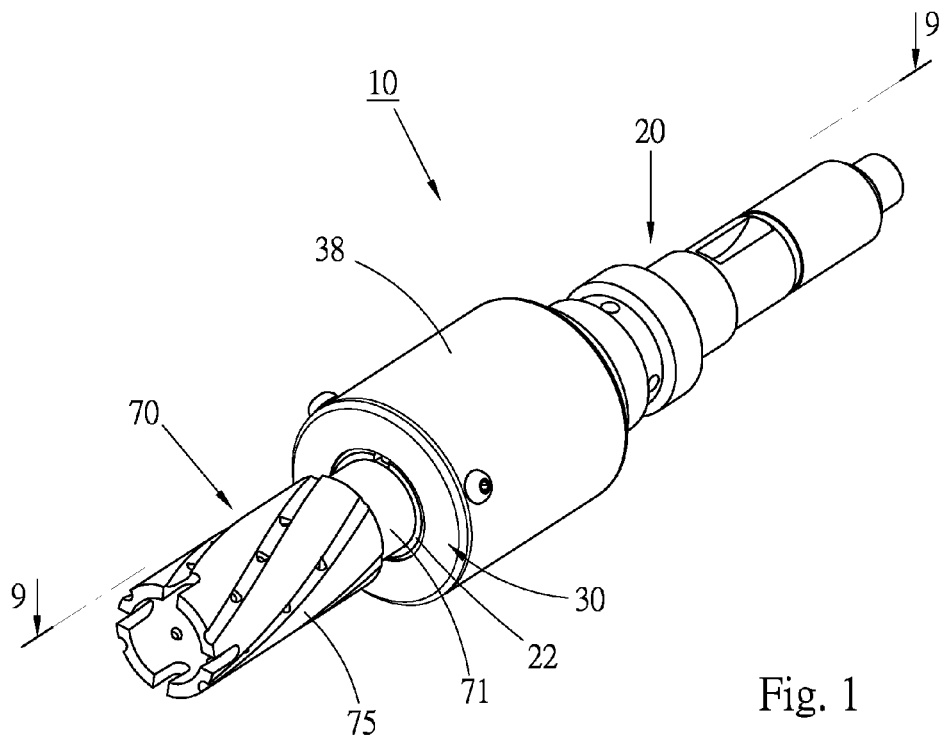
FIG. 1 is a perspective assembled view of a first embodiment of the present invention.

Please refer to FIGS. 1 to 4. According to a first embodiment, the cutting tool assembly of the present invention includes a mandrel member 10 and a cutting tool 70. The cutting tool assembly is installed on a rotary shaft of a tool machine with cutting or grinding function and rotatable with the rotary shaft for cutting or grinding a work piece. The mandrel member 10 is installed on the rotary shaft of the tool machine or is a part of the rotary shaft. The cutting tool 70 is, but not limited to, a tool with cutting or grinding function. In the description, claims and drawings, the cutting tool assembly is horizontally positioned for illustration purposes. With respect to a machine with a vertical rotary shaft, the present invention is installed on the rotary shaft in a vertical state.

The mandrel member 10 has a shaft rod 20 and a slide sleeve 30 mounted on the shaft rod 20.

Please refer to FIGS. 1 to 5. The shaft rod 20 has a front end, which is a sleeve section 22. A flange 21 is formed at a rear end of the sleeve section 22. A shaft cavity 24 axially inward extends from the front end of the sleeve section 22. At least one locking hole 26 and at least one engagement hole 28 are formed through the sleeve section 22 between an inner circumference and an outer circumference of the sleeve section 22 in communication with the shaft cavity 24. In this embodiment, there are three locking holes 26 annularly disposed on the sleeve section 22 at equal intervals. In this embodiment, there are three sets of engagement holes annularly disposed on the sleeve section at equal or unequal intervals. Each set of engagement holes has three engagement holes 28. The three engagement holes 28 are linearly axially arranged on the sleeve section 22 or alternately axially arranged on the sleeve section 22.

Figure 5:
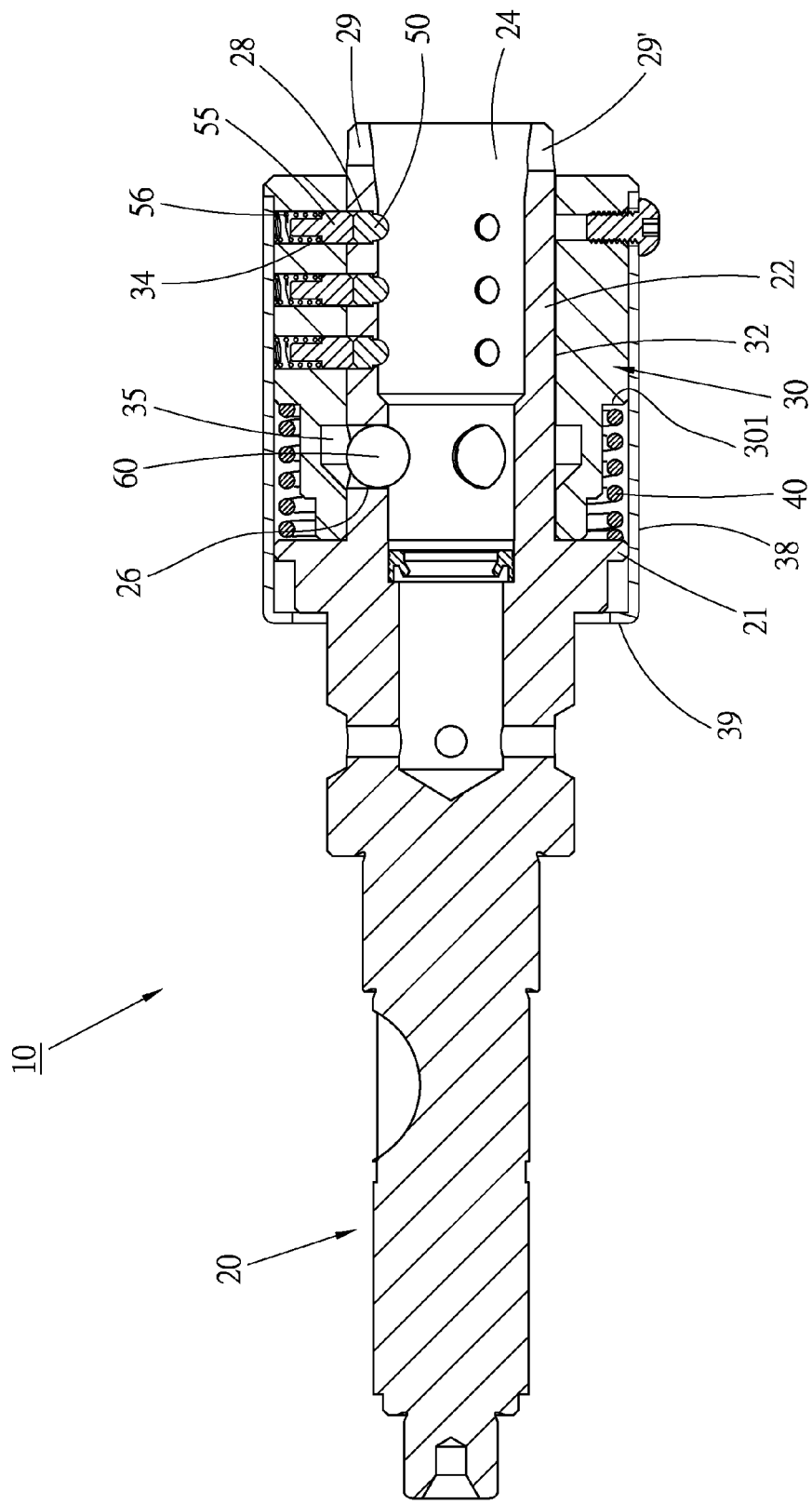
FIG. 5 is a sectional view taken along line 5-5 of FIG. 2.

The slide sleeve 30 is a hollow collar body having a passage 32 passing through the slide sleeve 30 between two ends thereof. At least one pinhole 34 is radially disposed on the slide sleeve 30 in alignment with the engagement hole 28 of the shaft rod 20. An inner end of the pinhole 34 communicates with the passage 32. In this embodiment, there are three sets of pinholes disposed on the slide sleeve 30 corresponding to the sets of engagement holes. Each set of pinholes has three pinholes 34. The three pinholes 34 are linearly axially arranged on the slide sleeve or alternately axially arranged on the slide sleeve. As shown in FIG. 5, one recess 35 is formed on inner circumference of the slide sleeve 30, the recess 35 can be one or multiple holes corresponding to the locking hole 26. In this embodiment, the recess is an annular groove. The slide sleeve 30 is fitted on the sleeve section 22 of the shaft rod 20 and slideable along the sleeve section 22 without rotation. The pinholes 34 of the slide sleeve 30 are aligned with the engagement holes 28 of the shaft rod 20. The recess 35 is aligned with the locking holes 26 of the shaft rod. Please refer to FIGS. 3, 7 and 8, an outer circumference of the sleeve section 22 is formed with an axial channel 221. An inner screw 36 and an abutment member 37, which is a steel ball, are embedded in the slide sleeve 30. The abutment member 37 is partially inlaid in the channel 221, whereby the slide sleeve 30 can only slide along the sleeve section, while prevented from rotating. As shown in FIG. 5, when the slide sleeve 30 is moved rearward to a releasing position where the pinholes 34 are right aligned with the engagement holes 28 and the recess 35 is right aligned with the locking holes 26; a rear end of the slide sleeve 30 touches the flange 21 of the shaft rod 20 as a dead end of the releasing position thereof.

Figure 9:
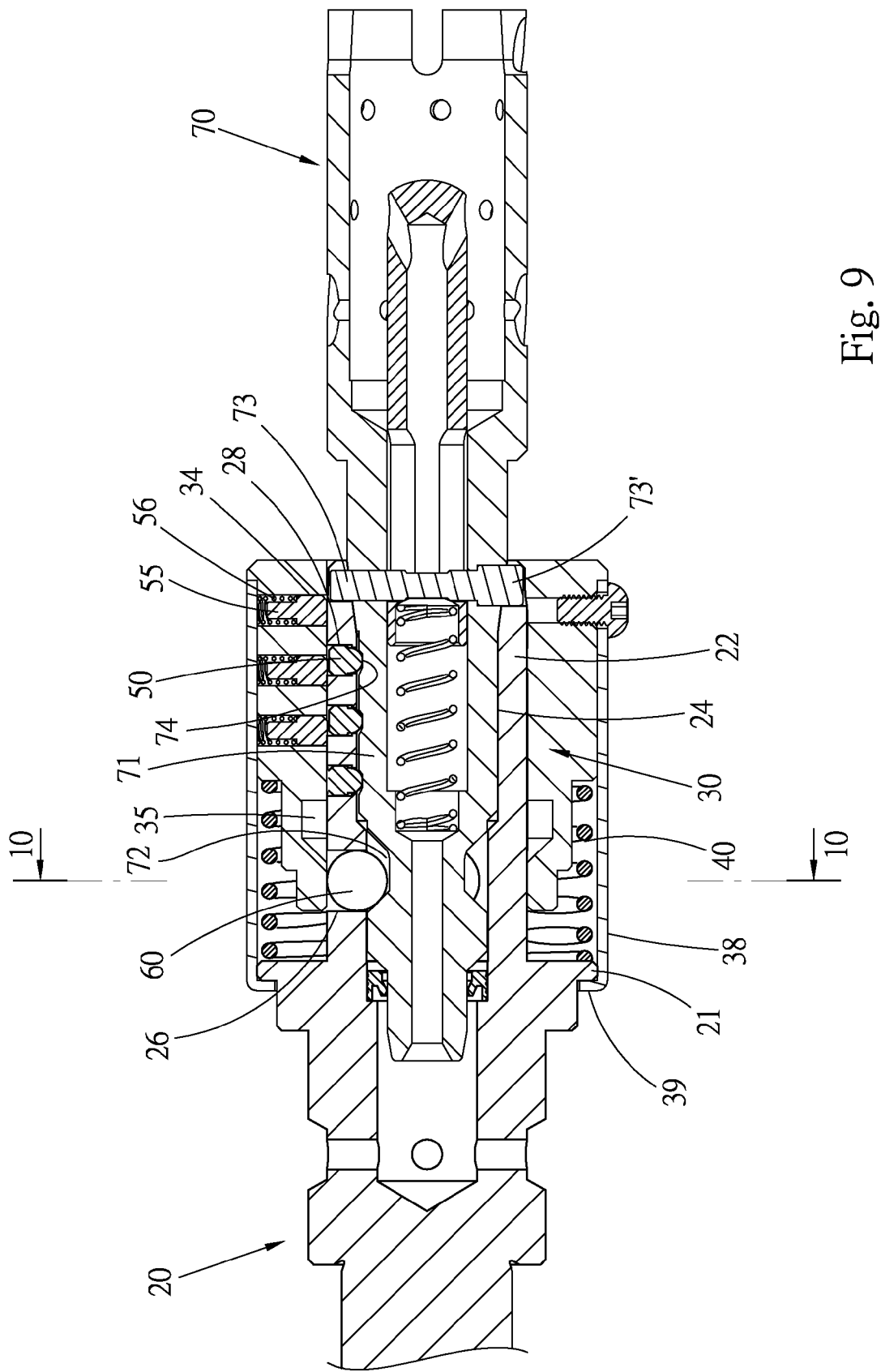
FIG. 9 is a sectional view taken along line 9-9 of FIG. 1, showing that the slide sleeve is positioned in the locking position.

An elastic member, which is a spring 40, is fitted around the slide sleeve 30. Two ends of the elastic member respectively abut against the flange 21 of the shaft rod 20 and a shoulder section 301 of the slide sleeve 30. The elastic member provides an elastic force to keep pushing the slide sleeve 30 to the front end of the shaft rod 20. In a locking state (this will be described hereinafter), the slide sleeve is pushed by the spring 40 to slide to a locking position as shown in FIG. 9.

A housing 38 in the form of a sleeve is fixedly disposed around the slide sleeve 30 to enclose the slide sleeve. An inner flange 39 is formed at a rear end of the housing 38. In this embodiment, when the slide sleeve 30 is moved to the locking position, the inner flange 39 of the housing 38 serves to abut against the flange 21 of the shaft rod 20 as a dead end of the locking position.

At least one alignment pin 50 is disposed in the at least one engagement hole 28 and slideable within the engagement hole. The number of the alignment pins is equal to the number of the engagement holes. Therefore, in this embodiment, there are nine alignment pins respectively mounted in the engagement holes 28 to form three sets of alignment pins. Each set of alignment pins is composed of three alignment pins. The three alignment pins are linearly arranged or alternately arranged. Please refer to FIG. 7. The inner end of each engagement hole 28 is formed with a small-diameter neck section 281. The circumference of each alignment pin 50 is formed with a stepped section 501. When the alignment pin 50 is moved to the inner end of the engagement hole 28 and the stepped section 501 is stopped by the neck section 281, the alignment pin 50 is positioned at a lower dead end. The inner end of the alignment pin 50 can protrude from the engagement hole 28 without dropping out of the engagement hole.

At least one engagement pin 55 and at least one resilient member 56 with a number equal to that of the pinholes 34 are respectively disposed in the pinholes 34. The engagement pins 55 are slideable within the pinholes. The resilient members 56 provide elastic force to keep the engagement pins 55 moving to the inner ends of the pinholes 34.

Figure 10:
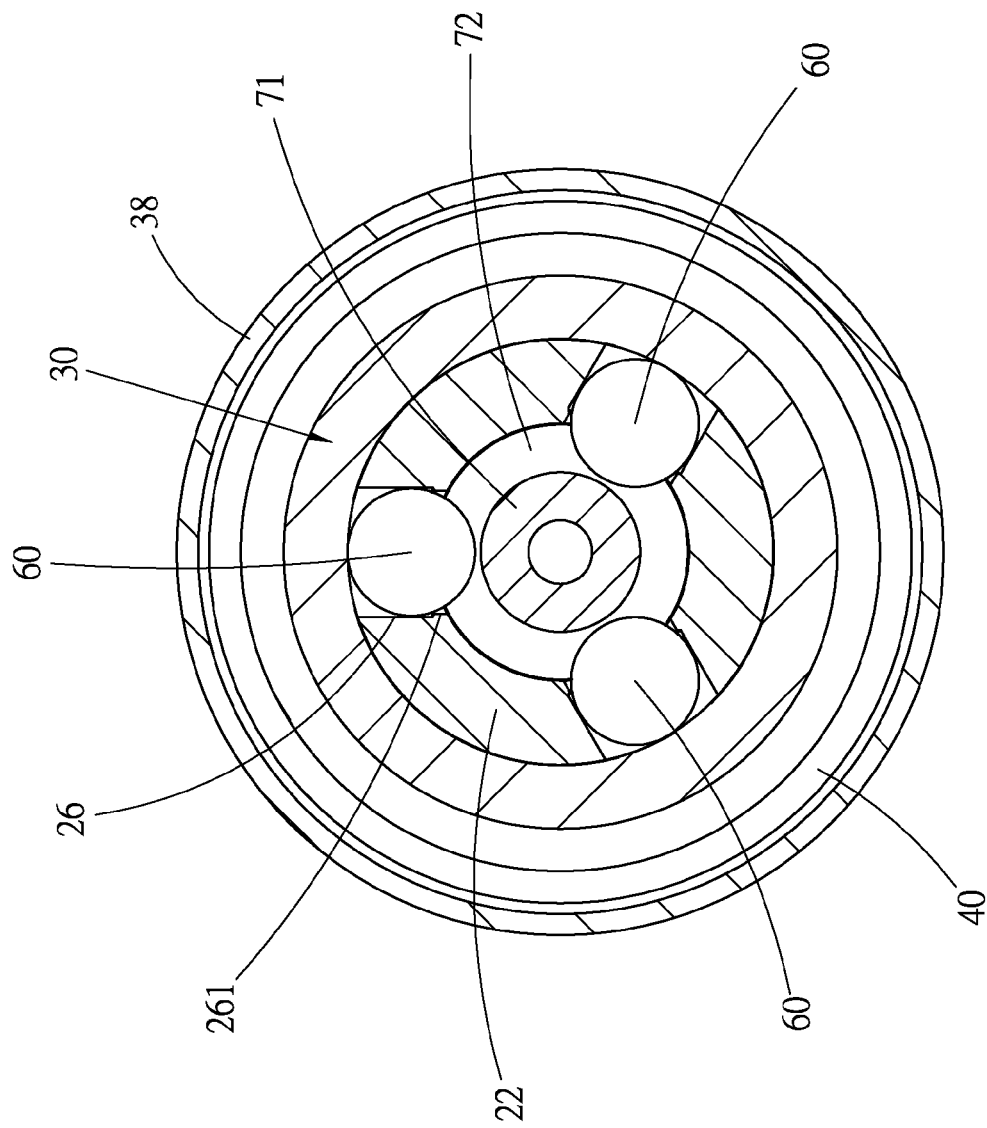
FIG. 10 is a sectional view taken along line 10-10 of FIG. 9.

At least one locking member 60 with a number equal to that of the locking holes 26 is disposed in the locking holes and slideable within the locking holes. Preferably, the locking members are steel balls. The inner end of each locking hole 26 is also formed with a small-diameter neck section 261 as shown in FIG. 10, whereby the inner end of the locking member 60 can protrude from the locking hole without dropping out of the locking hole.

The cutting tool 70 has a shank body 71 and a tool bit 75 disposed at one end of the shank body 71. The tool bit 75 can be, but not limited to, a milling cutter, a drill bit, a grinding plate or a grinding bar. A latch section 72 is disposed on the shank body 71, which can be at least one socket or an annular groove. In this embodiment, the latch section is an annular groove. At least one alignment sink 74 is disposed on the circumference of the shank body 71 in alignment with the alignment pin 50. In this embodiment, there are three sets of alignment sinks annularly arranged on the circumference of the shank body 71 at specific intervals. Similarly, the three alignment sinks are linearly axially arranged on the shank body or alternately axially arranged on the shank body.

Figure 6:
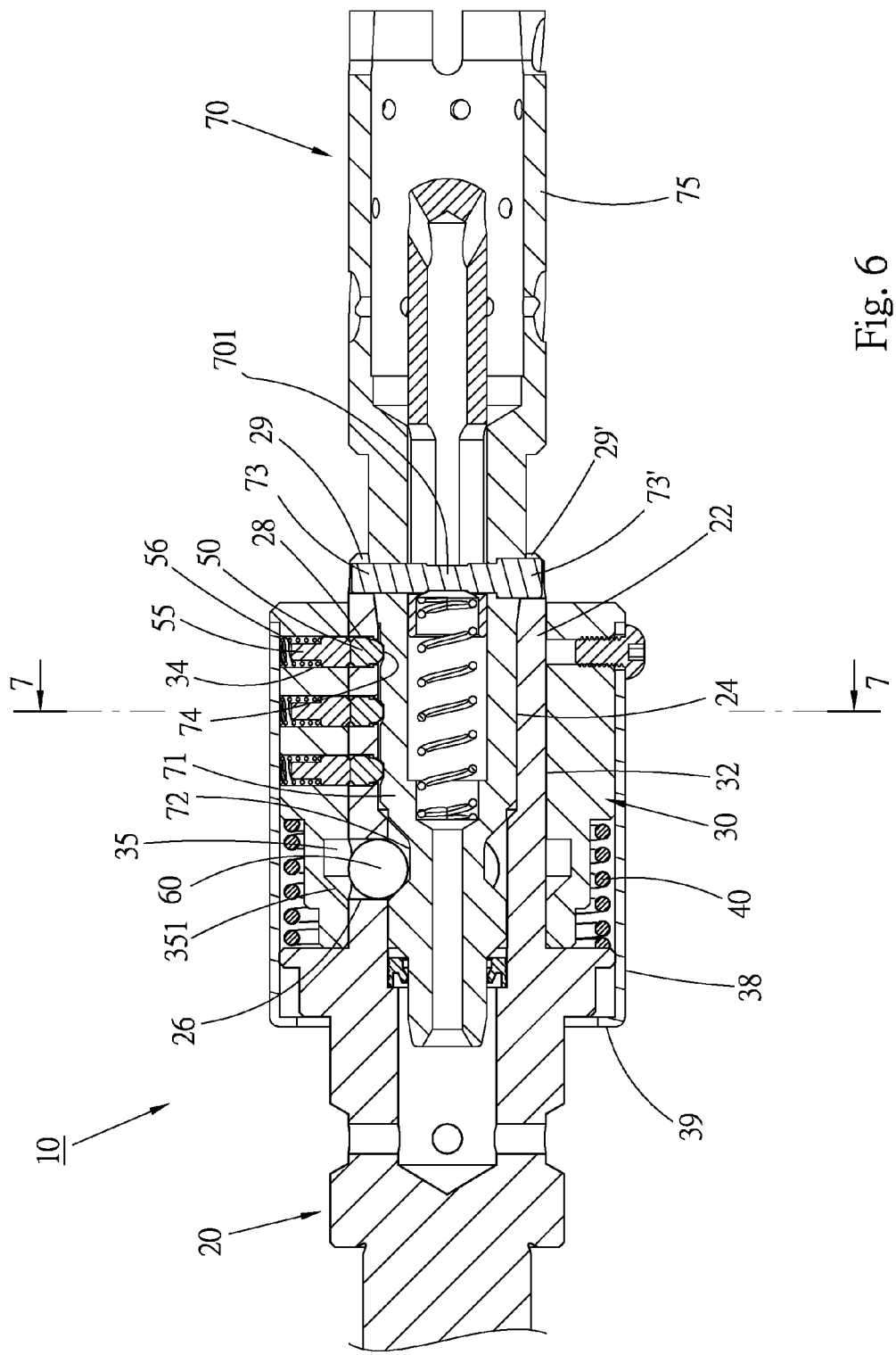
FIG. 6 is a sectional view of the first embodiment of the present invention, showing that the cutting tool is plugged in the mandrel member, but the slide sleeve is not yet moved to the locking position.

The shank body 71 of the cutting tool 70 is mounted into the sleeve section 22 of the shaft rod 20 to assemble with the mandrel member 10. In order to ensure that the cutting tool is mounted into the shaft rod 20 in a true angular position, the end edge of the front end of the sleeve section 22 is formed with at least one notch 29 and at least one boss 73 is disposed on the circumference of the shank body 71 of the tool 70. The boss 73 is aimed at the notch 29 and fitted into the notch 29 so as to align the cutting tool 70 with the shaft rod 20 and connect the cutting tool 70 with the shaft rod 20 in a true angular position. In this embodiment, two notches 29, 29' are formed at the front end of the sleeve section 22 with different widths. As shown in FIG. 6, a pin member 701 is passed through the shank body 71. Two ends of the pin member 701 form two bosses 73, 73' with different outer diameters. The larger boss 73' is aligned with the wider notch 29' so as to align the tool 70 with the mandrel 10 in a true angular position. The cutting tool 70 can be aligned with the mandrel 10 in other manners. For example, the sleeve section 22 can have a noncircular or polygonal cross section and the shank body 71 can also have a noncircular or polygonal cross section to achieve the alignment effect.

Figure 2:
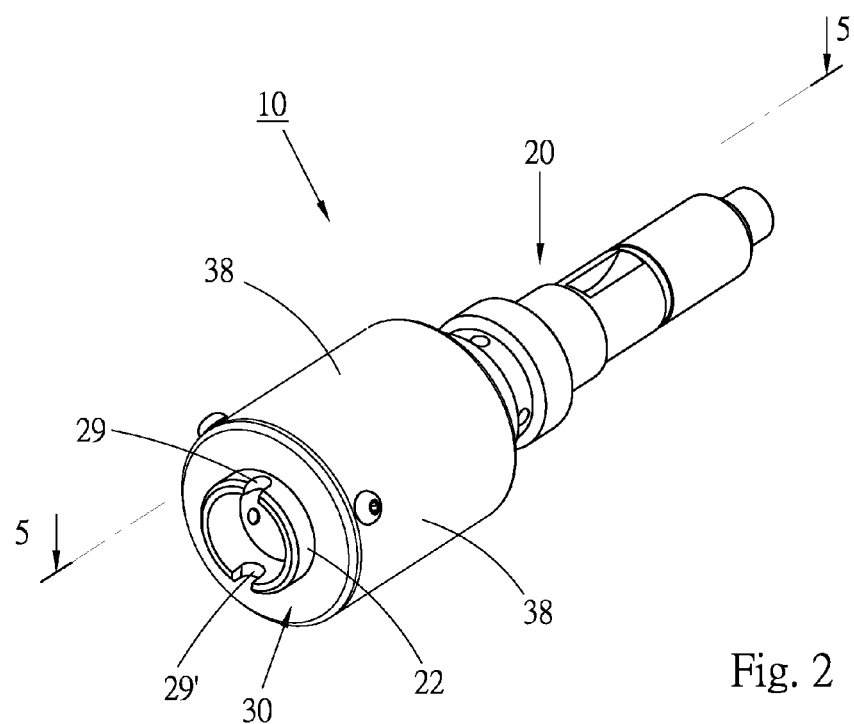
Figure 3:
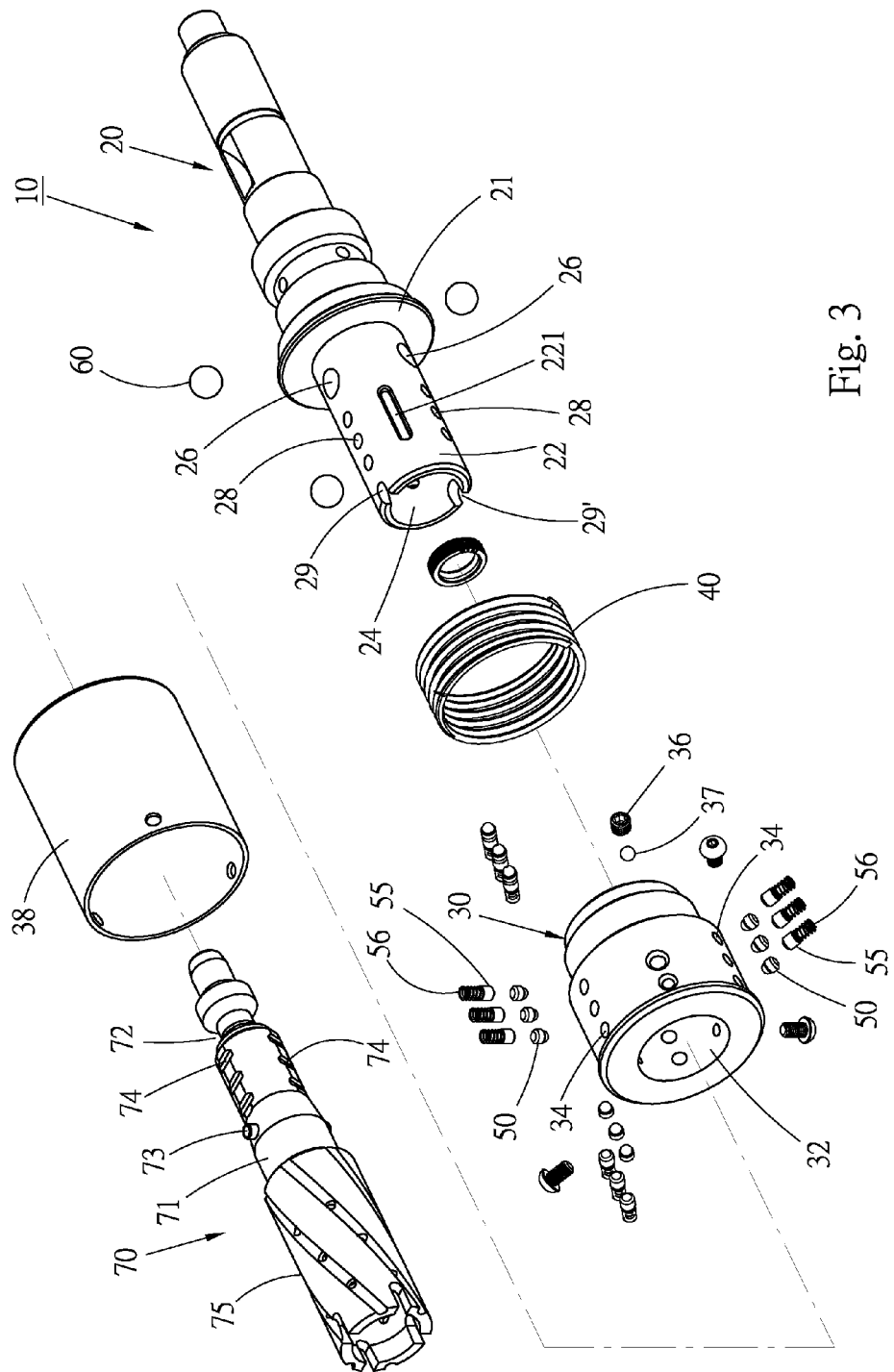
FIG. 3 is a front perspective exploded view of the first embodiment of the present invention.
Figure 4:
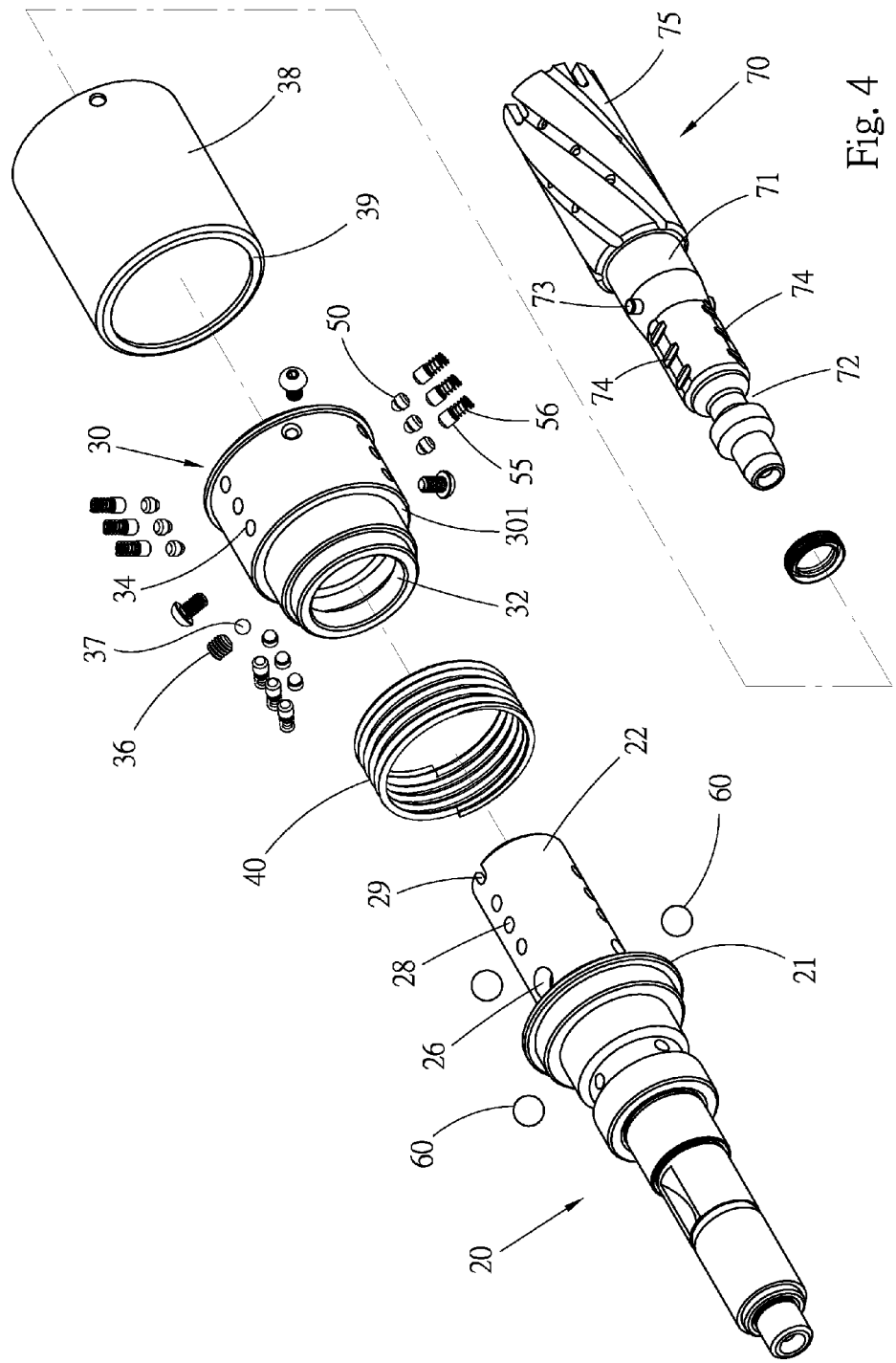
FIG. 4 is a rear perspective exploded view of the first embodiment of the present invention.

Please refer to FIGS. 2 and 5. Before the cutting tool 70 is mounted into the mandrel 10, the mandrel is in a ready state for installation of the cutting tool. At this time, the front end and the two notches 29, 29' of the sleeve section 22 are exposed to outer side of the slide sleeve 30, whereby a user can tell that the slide sleeve 30 is positioned in the releasing position.

Figure 7:
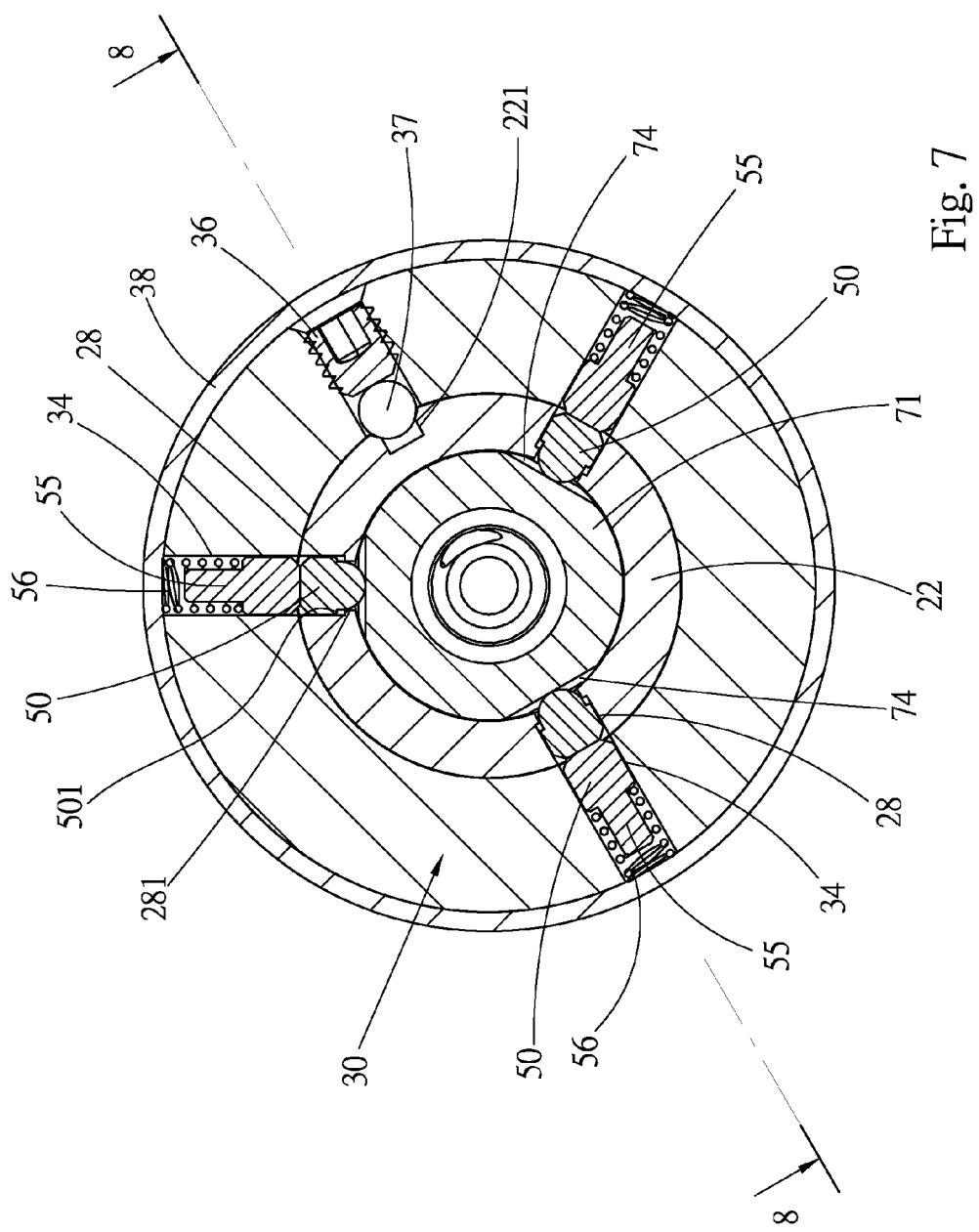
FIG. 7 is a sectional view taken along line 7-7 of FIG. 6.
Figure 8:
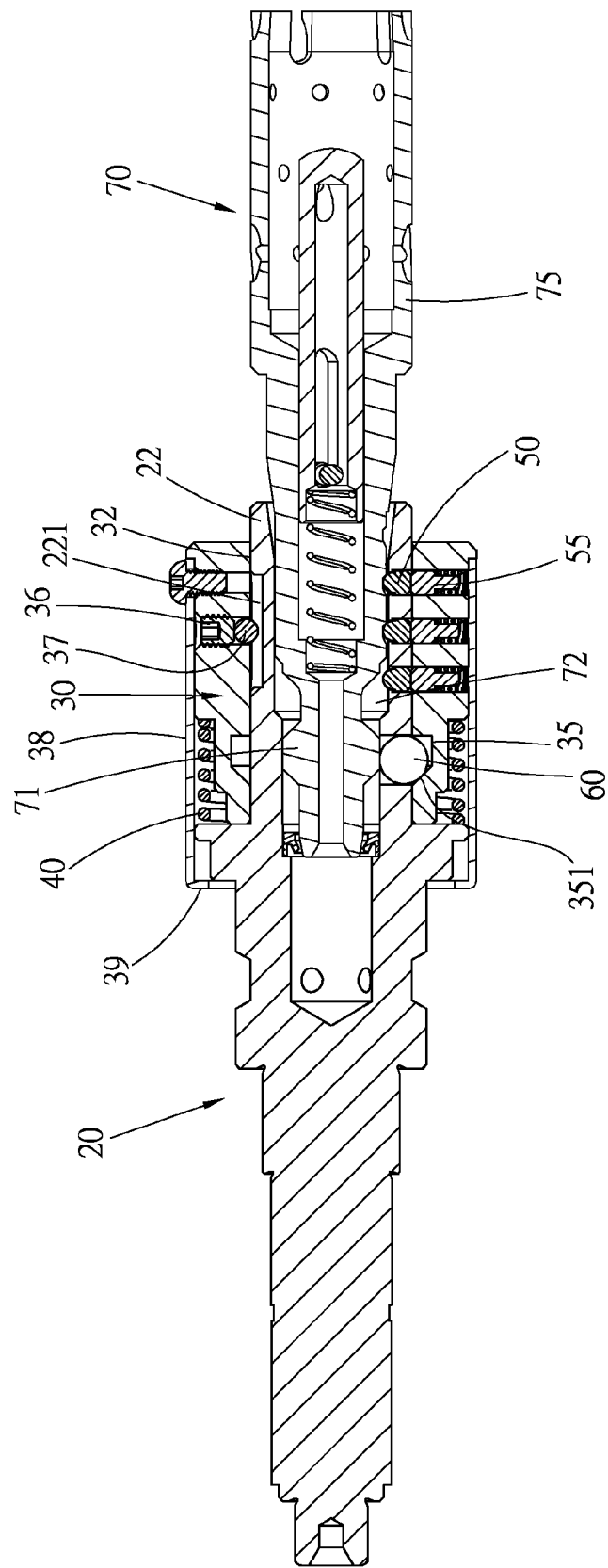
FIG. 8 is a sectional view taken along line 8-8 of FIG. 7, showing that the cutting tool is moved into or out of the mandrel member.

As shown in FIG. 6, when the cutting tool 70 is mounted and inserted into the mandrel member 10 to reach the dead end, the three sets of alignment sinks are right aligned with the three sets of alignment pins and the locking members 60 are right aligned with the latch section 72 of the shank body 71. The inner ends of the alignment pins 50 respectively contact the alignment sinks 74 of the shank body 71. At this time, the alignment pins 50 are aligned with the alignment sinks 74, whereby the alignment pins 50 are slid to the outer ends of the engagement holes 28 to push the inner ends of the engagement pins 55 to retract into the pinholes 34. When the alignment pins 50 are truly aligned with the alignment sinks 74, the outer ends of the alignment pins 50 and the inner ends of the engagement pins 55 are right positioned on the junction face between the slide sleeve 30 and the sleeve section 22 as shown in FIGS. 6 and 7. At this time, the engagement pins 55 are no longer engaged with the slide sleeve 30, whereby the slide sleeve 30 is released and becomes slideable. In this case, the spring 40 pushes the slide sleeve 30 to the locking position as shown in FIG. 9, where the recess 35 is displaced and misaligned from the locking hole 26 and the locking member 60. The rear end of the slide sleeve 30 abuts against the top edge of the locking member 60 to make the locking member 60 locked with the latch section 72 of the cutting tool 70 as shown in FIGS. 9 and 10. Under such circumstance, the cutting tool is prevented from detaching from the mandrel member 10 and the assembly of the cutting tool and the mandrel member is completed. When the slide sleeve 30 is moved to the locking position, in the case that the locking member 60 is not yet moved into the latch section 72, the slope 351 of the recess 35 can push the locking member 60 into the recess 35. After assembly, the mandrel member fastens the cutting tool, the mandrel member and the cutting tool are rotatable with each other.

During the installation of the cutting tool 70, a user only needs to install the cutting tool 70 into the mandrel member 10 in a ready state as shown in FIG. 5. After the alignment pins 50 are aligned with the alignment sinks 74, the slide sleeve 30 will automatically move the locking position as shown in FIG. 9. Therefore, the cutting tool 70 can be quickly locked with the mandrel member 10 without additional operation. It can be known from FIGS. 1 and 9 that when the mandrel member 10 latches the cutting tool 70, the front end of the slide sleeve 30 encloses the front end of the sleeve section 22 and the two bosses 73, 73'. Accordingly, in appearance, the sleeve section 22 does not protrude from the slide sleeve 30, whereby a user can tell that the mandrel member 10 is in a locked state.

When taking off or replacing the cutting tool 70, a user only needs to push and move the slide sleeve 30 from the locking position of FIG. 9 to the releasing position of FIG. 6 to release the locking member 60 from the abutment of the slide sleeve.

At this time, the cutting tool 70 can be taken out from the mandrel member 10. Please refer to FIG. 8, when taking out or inserting in the cutting tool 70, the locking member 60 will retract into the recess 35 without hindering the shank body 71 from moving in or out.

After the cutting tool 70 is detached from the mandrel member 10, the mandrel member will restore to the ready state as shown in FIGS. 2 and 5. At this time, the inner ends of the alignment pins 50 are in a suspended state, whereby the resilient members 56 push the engagement pins 55 to make the inner ends thereof extend into the engagement holes 28 of the sleeve section 22. In this case, the engagement pins 55 engage the engagement holes 28 to locate the slide sleeve 30 in the releasing position. The alignment pins 50 are pushed by the engagement pins 55 to move to the lower dead end where the inner ends of the alignment pins protrude from the engagement holes 28.

The alignment sinks 74 can be formed with different depths and the alignment pins 50 can be made with different lengths corresponding to the depths of the alignment sinks 74. Accordingly, various alignment assemblies can be achieved. That is, different combination codes can be achieved. Only a specific mandrel member and a specific cutting tool with a specific combination code (the positions and depths of the alignment sinks must conform to the positions and lengths of the alignment pins) can be truly assembled and connected. It is impossible for an incorrect cutting tool to assemble with the mandrel member.

FIGS. 11 and 12 show a second embodiment of the present invention. The same structures are denoted with the same reference numerals. The second embodiment is mainly different from the first embodiment in that the inner circumference of the slide sleeve 30 is free from the recess. At least one protruding push block 33 is formed on the inner circumference of the slide sleeve 30 and extends into the locking hole 26 of the sleeve section 22 of the shaft rod 20. When the slide sleeve is positioned in the releasing position of FIG. 11, the push block 33 is misaligned from the locking member 60 without abutting against the locking member. When the slide sleeve 30 is positioned in the locking position of FIG. 12, the push block 33 abuts against the locking member 60 to make the locking member locked with the latch section 72 of the cutting tool 70.

In use of the present invention, simply by means of a simple insertion operation, the cutting tool can be plugged into the mandrel member and locked therein. The assembling process can be quickly and conveniently performed. It is also quite convenient to take out or replace the cutting tool.

The mandrel member and the cutting tool of the present invention have a specific combination code. Only the mandrel member and cutting tool with identical combination code can be truly assembled and connected. Therefore, a user can manage the cutting tools to avoid incorrect installation or unauthorized use of the cutting tools and ensure that the cutting tools are provided by a true manufacturer.

The above embodiments are only used to illustrate the present invention, not intended to limit the scope thereof. Many modifications of the above embodiments can be made without departing from the spirit of the present invention. For example, there are many other ways to hinder the slide sleeve from rotating around the sleeve section. Also, the slide sleeve can be located in the locking position and the releasing position in many other manners without limitation to the above embodiments. In addition, the numbers and deployments of the sets of alignment sinks and the sets of alignment pins can be otherwise designed and changed.

What is claimed is:

1. A fast knockdown cutting tool assembly comprising:
a mandrel member including:
a shaft rod having a sleeve section at a front end of the shaft rod; a shaft cavity axially inward extending from a front end of the sleeve section; at least one locking hole and at least one engagement hole being formed through the sleeve section between an inner circumference and an outer circumference of the sleeve section;
a slide sleeve having a passage passing through the slide sleeve between two ends thereof; at least one pinhole being radially disposed on the slide sleeve, an inner end of the pinhole communicating with the passage; the slide sleeve being fitted on the sleeve section of the shaft rod and slideable along the sleeve section without rotation; the slide sleeve being rearward slideable to a releasing position and forward slideable to a locking position, when the slide sleeve is positioned in the releasing position, the pinhole being aligned with the engagement hole;
an elastic member disposed between the shaft rod and the slide sleeve for providing an elastic force to keep pushing the slide sleeve forward;
at least one alignment pin disposed in the engagement hole and slideable within the engagement hole;
at least one engagement pin and at least one resilient member with a number equal to that of the pinhole, which are disposed in the pinhole, the engagement pin being slideable within the pinhole; the resilient member providing an elastic force to keep the engagement pin moving to an inner end of the pinhole; when the slide sleeve is positioned in the releasing position, the inner end of the engagement pin extending into the engagement hole to push the alignment pin and make an inner end of the alignment pin extend out of the engagement hole; and
at least one locking member with a number equal to that of the locking hole, which is disposed in the locking hole and slideable within the locking hole; and
a cutting tool having a shank body and a tool bit disposed at one end of the shank body; a latch section being disposed on the shank body; at least one alignment sink being disposed on a circumference of the shank body; when the shank body of the cutting tool is plugged into the shaft cavity of the sleeve section of the shaft rod, an inner end of the alignment pin contacting the alignment sink and the engagement pin being pushed by the alignment pin to make the inner end of the engagement pin moved out of the engagement hole, whereby the slide sleeve is moved to the locking position to make the locking member latched with the latch section of the cutting tool.

2. The cutting tool assembly as claimed in claim 1, wherein the slide sleeve has a recess formed on an inner circumference of the slide sleeve; when the slide sleeve is positioned in the releasing position, the recess being right aligned with the locking hole, while when the slide sleeve is positioned in the locking position, the recess being misaligned from the locking hole and the slide sleeve abutting against the locking member.

3. The cutting tool assembly as claimed in claim 1, wherein at least one push block is disposed on the inner circumference of the slide sleeve; when the slide sleeve is positioned in the releasing position, the push block being misaligned from the locking member, while when the slide sleeve is positioned in the locking position, the push block abutting against the locking member.

4. The cutting tool assembly as claimed in claim 1, wherein a flange is formed on an outer circumference of the shaft rod; the cutting tool assembly further comprising a housing in the form of a sleeve, the housing being mounted around the slide sleeve; an inner flange being formed at a rear end of the housing; when the slide sleeve is positioned in the locking position, the inner flange of the housing abutting against the flange.

5. The cutting tool assembly as claimed in claim 1, wherein an end edge of the sleeve section of the shaft rod is formed with at least one notch; at least one boss being disposed on the shank body of the cutting tool; when the cutting tool is connected with the mandrel member, the boss being fitted into the notch.

6. The cutting tool assembly as claimed in claim 1, wherein the outer circumference of the sleeve section is formed with an axial channel and an abutment member is embedded in the slide sleeve and partially inlaid in the channel.

7. The cutting tool assembly as claimed in claim 1, wherein when the slide sleeve is positioned in the releasing position, the front end of the sleeve section is exposed to outer side of the slide sleeve, while when the slide sleeve is positioned in the locking position, the slide sleeve encloses the front end of the sleeve section.

8. The cutting tool assembly as claimed in claim 1, wherein multiple alignment sinks are disposed on the shank body of the cutting tool and multiple engagement holes are disposed on the sleeve section; the slide sleeve being formed with multiple pinholes; the cutting tool assembly comprising multiple alignment pins and multiple engagement pins respectively disposed in the engagement holes and the pinholes, the number and position of the engagement holes corresponding to the number and position of the alignment sinks.

9. The cutting tool assembly as claimed in claim 1, wherein the latch section of the cutting tool is at least one socket or an annular groove; when the locking member is latched with the latch section, the locking member moving into the latch section.

10. A fast knockdown cutting tool assembly comprising:
a mandrel member including:
a shaft rod having a sleeve section at a front end of the shaft rod; a shaft cavity axially inward extending from a front end of the sleeve section; at least one engagement hole being formed on the sleeve section;
a slide sleeve, which is a hollow collar body; at least one pinhole being radially disposed on the slide sleeve; the slide sleeve being fitted on the sleeve section of the shaft rod and slideable along the sleeve section without rotation, the slide sleeve being rearward slideable to a releasing position and forward slideable to a locking position, when the slide sleeve is positioned in the releasing position, the pinhole being aligned with the engagement hole;
an elastic member fitted around the slide sleeve, two ends of the elastic member respectively abutting against the slide sleeve and the shaft rod to provide an elastic force to keep pushing the slide sleeve forward;
at least one alignment pin disposed in the engagement hole and slideable within the engagement hole;
at least one engagement pin and at least one resilient member disposed in the at least one pinhole, the engagement pin being slideable within the pinhole; the resilient member providing an elastic force to keep the engagement pin moving to an inner end of the pinhole; when the slide sleeve is positioned in the releasing position, the inner end of the engagement pin extending into the engagement hole to push the alignment pin and make inner end of the alignment pin extend out of the engagement hole; and at least one locking member disposed between the sleeve section and the slide sleeve, the locking member being movable in a radial direction of the sleeve section; and a cutting tool having a shank body and a tool bit disposed at one end of the shank body; a latch section being disposed on the shank body; at least one alignment sink being disposed on a circumference of the shank body; when the shank body of the cutting tool is plugged into the shaft cavity of the sleeve section of the shaft rod, an inner end of the alignment pin contacting the alignment sink and the engagement pin being pushed by the alignment pin to make the inner end of the engagement pin moved out of the engagement hole, whereby the slide sleeve is moved to the locking position to make the locking member latched with the latch section of the cutting tool.

11. The cutting tool assembly as claimed in claim 10, wherein an end edge of the sleeve section of the shaft rod is formed with at least one notch; at least one boss being disposed on the shank body of the cutting tool; when the cutting tool is connected with the mandrel member, the boss being fitted into the notch.

12. The cutting tool assembly as claimed in claim 10, wherein when the slide sleeve is positioned in the releasing position, the front end of the sleeve section is exposed to outer side of the slide sleeve, while when the slide sleeve is positioned in the locking position, the slide sleeve encloses the front end of the sleeve section.

13. The cutting tool assembly as claimed in claim 10, wherein multiple alignment sinks are disposed on the shank body of the cutting tool and multiple engagement holes are disposed on the sleeve section; the slide sleeve being formed with multiple pinholes; the cutting tool assembly comprising multiple alignment pins and multiple engagement pins respectively disposed in the engagement holes and the pinholes, the number and position of the engagement holes corresponding to the number and position of the alignment sinks.

14. The cutting tool assembly as claimed in claim 10, wherein the outer circumference of the sleeve section is formed with an axial channel and an abutment member is embedded in the slide sleeve and partially inlaid in the channel.

15. The cutting tool assembly as claimed in claim 10, wherein the latch section of the cutting tool is at least one socket or an annular groove; when the locking member is latched with the latch section, the locking member moving into the latch section.

16. The cutting tool assembly as claimed in claim 10, wherein a flange is formed on an outer circumference of the shaft rod; the cutting tool assembly further comprising a housing in the form of a sleeve, the housing being mounted around the slide sleeve; an inner flange being formed at a rear end of the housing; when the slide sleeve is positioned in the locking position, the inner flange of the housing abutting against the flange.

* * * * *